United States Patent Office 3,303,553
Patented Feb. 14, 1967

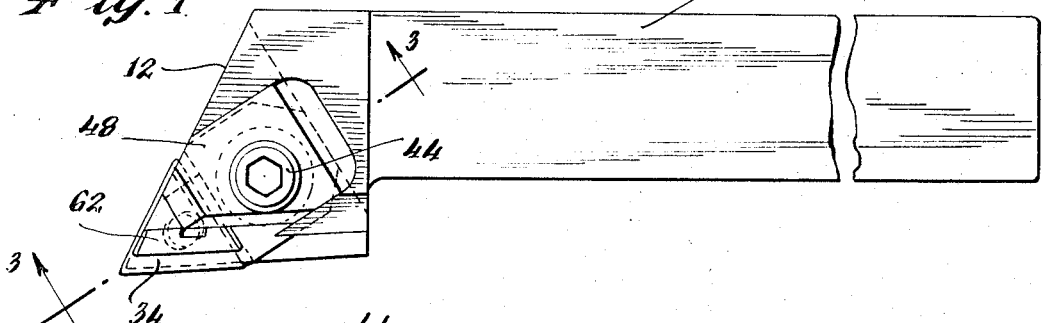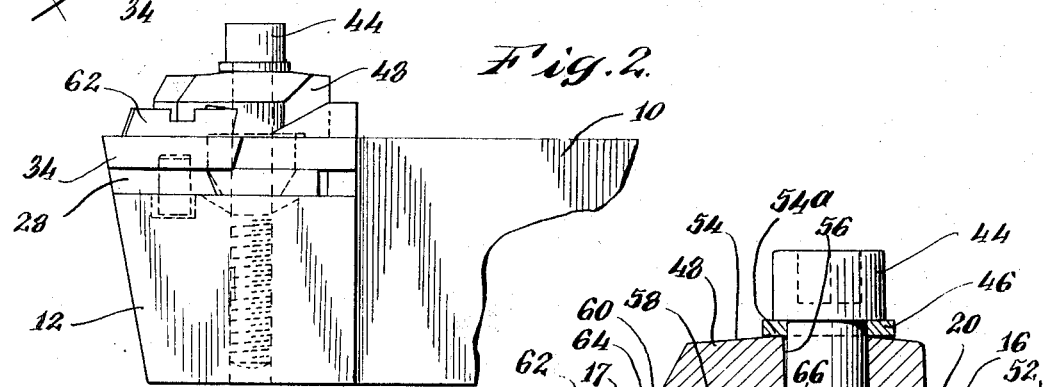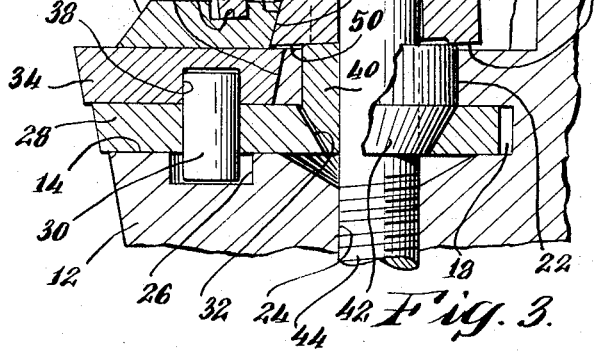

3,303,553
CUTTING TOOL ASSEMBLY
Ole C. Severson, Shelton, Conn., assignor to The Viking Tool Company, Shelton, Conn., a corporation of Connecticut
Filed Aug. 24, 1964, Ser. No. 391,540
7 Claims. (Cl. 29—96)

This invention relates to a cutting tool assembly and, more particularly, to a holder which is particularly adapted to position and retain a throw-away indexible metal cutting insert.

Various types of high speed metal cutting machines require a tool holder which retains a replaceable cutting tool therein. This tool is normally an insert of hard metal which is retained in the tool holder in a preselected cutting position and is of the throw-away type. The insert is usually indexible so that, as dulling of each side occurs, it can be indexed to a new cutting position. Eventually, when the insert is completely used, it may be thrown away and replaced.

It is also desirable that such tool holders and inserts have certain characteristics. One of these is that the insert should be clamped in such a manner and with sufficient force that a positive rake angle may be employed during the cutting operation. Allied with this characteristic is the requirement that the sides of the insert should be tapered to allow efficient cutting at such a positive rake angle. This requirement of tapered side walls, however, makes the cutting insert difficult to position and retain in a holder and a number of approaches have been attempted in the prior art to overcome this difficulty. One prior art assembly utilizes a cutting insert having a certain number of straight side edges in addition to the tapered edges which form the cutting sides. The disadvantage of tools of this type is that the cutting insert has noncutting edges so that it is not completely indexible and is more expensive for the user. Furthermore, the holder required with such an insert is more expensive as it must be formed with a pocket within which the insert is seated. Furthermore, it would be helpful to position a triangular insert so that it can be used on two edges. This is highly desirable in tracing operations.

Various approaches have been attempted to solve these particular problems. In one such approach, for example, a horizontal force is applied against the insert in order to seat it against a portion of the tool holder. In the approaches which have been heretofore attempted, application of such a horizontal force results in a turning moment being applied to the insert which is self-defeating in that the horizontal force is thereby reduced. It has also been attempted to employ cutting inserts which have holes extending through them which are used for application of the seating forces. Inserts of this type, however, are weakened by the presence of the holes and, in addition, are often unusable in conventionl tool holders. It is also desirable that such a holder clamp not only the cutting insert but also the chip breaker and that the chip breaker be retained in such a fashion that it does not fall out when the clamping action is released from the cutting insert.

Accordingly, it is a primary object of the present invention to provide an improved cutting tool assembly for use in metal cutting machines. Other objects are to provide such an assembly which includes a holder for retaining a throw-away insert in a pre-set position and at a preselected angle; which is particularly well adapted to use with a cutting insert having tapered edges; wherein the insert is indexible and has no unusable edges; wherein the seating forces applied to the cutting insert are close-coupled and introduce essentially no undesirable turning moments; wherein the cutting insert does not require the presence of a hole completely therethrough; wherein the insert may be used in other styles of holders; wherein the holder does not require a pocket for seating the insert through the chip breaker; and wherein the chip breaker is retained in the holder after the clamping force has been removed from the cutting insert.

The manner in which the foregoing objects are achieved will be more apparent from the following description, the appended claims, and the figures of the attached drawing, wherein:

FIG. 1 is a plan view of a cutting tool assembly constructed in accordance with this invention;

FIG. 2 is an elevational view of the assembly of FIG. 1;

FIG. 3 is an enlarged cross section taken along the line 3—3 of FIG. 1; and

FIG. 4 is an exploded view illustrating the various elements of a cutting tool assembly constructed in accordance with this invention.

With reference to the drawings, there is illustrated a tool holder including a shank portion 10 and a clamping head 12. The end of clamping head 12 is essentially triangular in cross section as is most clearly apparent in FIGS. 1 and 4. The clamping head 12 includes a horizontal flat surface 14, and a shelf 16 which is spaced from and parallel to surface 14 so as to form a slot 18. The edge of the shelf 16 forms a slanted positioning and backing surface 17. The upper surface of shelf 16 is cut away so as to form a generally rectangular recess 20 surrounding a circular straight-sided opening 22. The lower portion of clamping head 12 also includes a tapped hole 24. In line with the opening 22, and between the hole 24 and the triangular point of the clamping head, there is provided an elongated recess 26.

In assembling the tool holder, there is positioned in slot 18, a sliding planar anvil 28. The anvil 28 is shaped so that one end is generally triangular to conform with the shape of the clamping head 12. The anvil includes a pin 30 which extends completely therethrough. The lower end of pin 30 is positioned in the recess 26. The anvil 28 also includes a conically tapered opening 32 substantially in alignment with the opening 22 and the tapped hole 24. The dimensions of the anvil 28 are such that it is readily slidable within slot 18, its straight back edge being spaced from the back end of slot 18 as shown in FIG. 3.

The cutting insert 34 which is employed with this invention is triangular in shape and includes identical tapered side edges 36 which permit a positive rake angle during the cutting operation. It is important to note that the insert 34 is symmetrical and in the form of an equilateral triangle, the lower surface of the insert defining a circular recess 38 which is centrally located relative to the corners of the triangle. Accordingly, the insert 34 is completely indexible in that, as soon as a cutting edge becomes dull, the insert may be indexed so as to present a new cutting edge, thereby greatly extending its life. Furthrmore, the insert is so positioned that one corner and two edges are simultaneously exposed. It will also be noted that as the recess 38 does not exend completely through the insert, substantially no weakening occurs. The insert 34 is positioned on the pin 30 so that one of its tapered edges abuts against the tapered surface 17 formed by the front edge of shelf 16 as illustrated in FIG. 3. A clamping plunger 40 is positioned within the opening 22 in shelf 16 and within the tapered opening 32 in the anvil 28. The upper portion of the plunger 40 is cylindrical so as to mate with the opening 22. The lower portion is in the form of a truncated cone 42 which generally conforms to the configuration of the tapered opening 32 in the anvil 28. It is important to note, however, that the opening 32 is slightly offset from the center line of the plunger 40 when the cutting insert 34 is seated against the edge 17.

This is illustrated in FIG. 3 wherein it will be noted that the back edge of conical surface 42 abuts the back of the tapered opening 32 while some clearance exists between the corresponding front portions. A clamping screw 44 and washer 46 is used to position a clamp 48 in the recess 20.

The configuration of clamp 48 will be most clearly understood by reference to FIGS. 3 and 4. Clamp 48 is essentially a metallic block which is designed to fit within recess 20 and around the clamping screw 44. The lower surface 50 is essentially planar but across the rear of the lower surface there is provided a slightly raised shoulder 52 which is designed to rest against the upper surface of clamping plunger 40. Shoulder 52 may extend, for example, 1/64 inch from the lower surface 50. The upper surface 54 of clamp 48 is curved and a central opening 56 extends between the upper and lower surfaces to receive the clamping screw 44 therein. The opening 56 is slightly oversized relative to the clamping screw, and the upper surface 54 is curved in such a manner that the highest point 54a lies beneath the front surface of washer 46. The front of the clamp 48 is narrowed as shown in FIG. 4 and is cut away and recessed to form a tapered keyway 58 bounded by a depending front lip 60. A chip breaker 62 is positioned between the front end of the clamp 48 and the upper surface of the insert 34. The chip breaker is essentially triangular and is provided with a recess 64 which extends across its upper surface and receives the lip 60 of clamp 48. The back surface 66 of the chip breaker is tapered to conform to the dimensions of the keyway 58. The chip breaker is slid into the keyway 58 from the side and is thereafter loosely retained by the cooperation of the keyway with the depending lip 60. Accordingly, loosening and even removal of clamp 48 from the tool holder will not allow chip breaker 62 to be released.

The operation of the holder of this invention may be best understood by reference to FIG. 3. When the parts of the holder have been assembled in the manner previously described, the screw 44 is tightened and advances downwardly into the clamping head 12. The increasing pressure on the clamp 48 is transmitted through the shoulder 52 to the clamping plunger 40 so that it too is driven downward. The tapered back surface of the conical portion 42 of plunger 40 rests against the back surface of tapered opening 32 in the anvil 28. Accordingly, downward motion of the clamping plunger 40 cams the anvil 28 rearwardly, thus causing the pin 30 which is affixed thereto to slide rearwardly in the elongated recess 26. As pin 30 also extends upwardly into the recess 38 in the cutting insert 34, this triangular insert is also forced to the rear causing its tapered rear wall to seat firmly against the surface 17 of the shelf 16 of the tool holder. Simultaneously with this rearward motion of the cutting insert, the washer 46 bears downwardly on the high point 54a of the curved upper surface 54 of clamp 48. The clamp 48 is thus caused to rotate about the raised shoulder 52, causing lip 60 to bear firmly downward on the chip breaker 62 which transmits the force directly onto the upper surface of the cutting insert 34. Thus, cutting insert 34 is subjected simultaneously both to the rearward force, which seats it firmly into position against positioning and backing surface 17, and also to a strong vertical force which retains it securely in position.

It will be noted that all the forces which act upon the insert 34 are extremely close-coupled. In other words, no turning moment is exerted against the cutting insert so that there is no loss of force due to such moments. It will also be realized that this invention has attained all the objects previously set forth. For example, even though the insert is tapered and would normally be expected to be more difficult to retain in a secure locked position, it is now firmly seated against the surface 17. It should also be noted that the recess 38 which controls the horizontal placement of the insert 34 extends only partially through the insert so that substantially no weakening of the insert occurs. Furthermore, the insert 34 is retained so firmly that a positive rake angle may be maintained without its "climbing out" of position. Finally, it will be noted that the chip breaker 62 is retained by being dovetailed into keyway 58 so that it cannot be accidentally dropped or lost when the clamping screw 44 is unscrewed to release the clamp 48.

In order to index cutting insert 34 to a new position, it is merely necessary to loosen screw 44 and lift clamp 48. The chip breaker 62 remains in engagement with the clamp 48 and is also lifted. The insert 34 is then removed from pin 30, indexed to a new cutting position, and replaced on pin 30. The clamp 48 and chip breaker 62 are repositioned and screw 44 tightened.

It will be apparent to those skilled in the art that a number of variations and modifications may be made in this invention without departing from its spirit and scope. Accordingly, it is to be understood that the foregoing description is illustrative only rather than limiting. This invention is limited only by the scope of the following claims:

What I claim as new and desire to secure by Letters Patent of the United States is:

1. A cutting assembly for a machine tool comprising: a tool holder adapted to be supported by the machine tool and having a tool holder head including a positioning surface and slidably movable planar seat means; a cutting insert supported on said planer seat means for movement therewith and having a first side disposed to function as a cutting implement and a second side arranged to position against said positioning surface; a chip-breaking plate removably supported on said cutting insert; and clamping means having a first portion arranged to slidably move said planer seat means to position the second side of said cutting insert against said positioning surface and a second portion arranged to said cutting insert, whereby said cutting insert is simultaneously clamped and positioned in said tool holder head.

2. The assembly of claim 1 wherein said planer seat means defines a tapered opening therethrough and wherein the first portion of said clamping means comprises a tapered plunger advanceable into said tapered opening.

3. The assembly of claim 1 wherein said cutting insert is multisided and each side is arranged to be selectively independently used as a cutting implement and, alternately, to seat against said positioning surface.

4. The assembly of claim 1 wherein the sides of said insert are tapered.

5. The assembly of claim 1 wherein said cutting insert includes a recess extending partially therethrough and wherein said planar seat means includes a pin member seated in said recess.

6. A cutting assembly for a machine tool comprising: a tool holder adapted to be supported by the machine tool and having a tool holder head including an inclined positioning surface; seating plate means defining a tapered opening therethrough and pin means extending outwardly from each of its first and second major surfaces, said seating plate means being slidably moveable in said tool holder head; guide means defined by said tool holder head positioned to receive said pin means extending from the second major surface of said seating plate; a triangular plate-like cutting insert having tapered edges and defining a centrally located recess extending partially therethrough, said insert being mounted on said seating plate with its recess engaging the pin means extending from the first major surface of said seating plate; a chip-breaking plate positioned on said cutting insert; and screw means comprising a tapered plunger advanceable into the tapered opening of said seating plate to slide said seating plate relative to said tool holder head to urge one tapered edge of said cutting insert against said inclined positioning surface, and a clamping head arranged to simultaneously urge said tapered plunger into said tapered opening and force the chip-breaking plate against the cutting insert.

7. The assembly of claim 6 wherein said clamping head defines a tapered keyway and said chip-breaking plate includes a tapered flange seated therein whereby said plate is removably secured to said clamping head.

References Cited by the Examiner

UNITED STATES PATENTS 2,598,581  5/1952  McKenna _____ 29—96
2,870,523  1/1959  Richard _____ 29—96
2,897,580  8/1959  Huber _____ 29—96
3,084,416  4/1963  Broughton _____ 29—96

FOREIGN PATENTS 1,126,701  3/1962  Germany.

WILLIAM W. DYER, JR., *Primary Examiner.*

HARRISON L. HINSON, *Examiner.*